United States Patent
Wilkin, II et al.

(10) Patent No.: US 10,458,426 B2
(45) Date of Patent: Oct. 29, 2019

(54) AIRCRAFT FAN WITH LOW PART-SPAN SOLIDITY

(71) Applicant: General Electric Company, Schenectady, NY (US)

(72) Inventors: Daniel Allen Wilkin, II, West Chester, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 15/266,603

(22) Filed: Sep. 15, 2016

(65) Prior Publication Data

US 2018/0073518 A1  Mar. 15, 2018

(51) Int. Cl.

| | |
|---|---|
| *F04D 29/38* | (2006.01) |
| *F01D 5/14* | (2006.01) |
| *F02K 3/06* | (2006.01) |
| *F04D 29/52* | (2006.01) |
| *F04D 29/34* | (2006.01) |
| *F04D 29/32* | (2006.01) |

(52) U.S. Cl.
CPC ............ *F04D 29/384* (2013.01); *F01D 5/14* (2013.01); *F02K 3/06* (2013.01); *F04D 29/325* (2013.01); *F04D 29/34* (2013.01); *F04D 29/522* (2013.01); *F05D 2220/326* (2013.01); *F05D 2220/36* (2013.01); *F05D 2240/12* (2013.01); *F05D 2240/14* (2013.01); *F05D 2240/30* (2013.01); *F05D 2300/133* (2013.01); *F05D 2300/603* (2013.01); *Y02T 50/672* (2013.01); *Y02T 50/673* (2013.01)

(58) Field of Classification Search
CPC ..................... F05D 2220/324; F05D 2220/326
See application file for complete search history.

(56) References Cited

U.S. PATENT DOCUMENTS

| | | |
|---|---|---|
| 4,358,246 A | 11/1982 | Hanson et al. |
| 4,370,097 A | 1/1983 | Hanson et al. |
| 4,824,325 A | 4/1989 | Bandukwalla |
| 4,971,520 A | 11/1990 | Van Houten |
| 5,167,489 A | 12/1992 | Wadia et al. |
| 5,169,288 A | 12/1992 | Gliebe et al. |
| 5,273,400 A | 11/1993 | Amr |

(Continued)

*Primary Examiner* — Jason D Shanske
*Assistant Examiner* — Jason G Davis
(74) *Attorney, Agent, or Firm* — General Electric; Pamela Kachur

(57) ABSTRACT

A fan for a gas turbine engine includes: an annular casing; a disk disposed inside the casing and mounted for rotation about an axial centerline, the disk including a row of fan blades extending radially outwardly therefrom; each of the fan blades including an airfoil having circumferentially opposite pressure and suction sides extending radially in span from a root to a tip, and extending axially in chord between spaced-apart leading and trailing edges, with the airfoils defining corresponding flow passages therebetween for pressurizing air; the row including no more than 21 and no less than 13 of the fan blades; and wherein each of the fan blades has a solidity defined by a ratio of the airfoil chord over a circumferential pitch of the fan blades, measured at 60% of a radial distance from the root to the tip, of less than about 1.6.

12 Claims, 6 Drawing Sheets

(56) References Cited

U.S. PATENT DOCUMENTS

| | | |
|---|---|---|
| 5,478,199 A | 12/1995 | Gliebe |
| 5,584,660 A | 12/1996 | Carter et al. |
| 5,642,985 A | 7/1997 | Spear et al. |
| 5,735,673 A | 4/1998 | Matheny et al. |
| 5,769,607 A | 6/1998 | Neely et al. |
| 5,810,555 A | 9/1998 | Savage et al. |
| 5,906,179 A | 5/1999 | Capdevila |
| 6,048,174 A | 4/2000 | Samit et al. |
| 6,059,532 A | 5/2000 | Chen et al. |
| 6,071,077 A | 6/2000 | Rowlands |
| 6,315,521 B1 | 11/2001 | Hunt |
| 6,328,533 B1 | 12/2001 | Decker et al. |
| 6,338,609 B1 | 1/2002 | Decker et al. |
| 6,368,061 B1 | 4/2002 | Capdevilla |
| 6,386,830 B1 | 5/2002 | Slipper et al. |
| 6,471,474 B1 | 10/2002 | Mielke et al. |
| 6,524,070 B1 | 2/2003 | Carter |
| 6,561,760 B2 | 5/2003 | Wadia et al. |
| 6,561,761 B1 | 5/2003 | Decker et al. |
| 6,562,227 B2 | 5/2003 | Lamphere |
| 6,991,428 B2 | 1/2006 | Crane |
| 7,195,456 B2 | 3/2007 | Aggarwala et al. |
| 7,374,403 B2 | 5/2008 | Decker et al. |
| 7,476,086 B2 | 1/2009 | Wadia et al. |
| 8,075,259 B2 | 12/2011 | Praisner et al. |
| 8,360,731 B2 | 1/2013 | Nash et al. |
| 8,403,629 B2 | 3/2013 | Lundbladh |
| 8,911,215 B2 | 12/2014 | Cornelius et al. |
| 9,470,093 B2 * | 10/2016 | Gallagher .......... F01D 5/14 |
| 9,790,797 B2 * | 10/2017 | Gallagher .......... F01D 5/141 |
| 2008/0226454 A1 * | 9/2008 | Decker .......... F04D 29/384 416/203 |
| 2012/0082559 A1 * | 4/2012 | Guglielmin .......... B82Y 30/00 416/241 R |
| 2013/0282307 A1 | 10/2013 | El Shamy et al. |
| 2013/0340406 A1 | 12/2013 | Gallagher et al. |

* cited by examiner

AIRCRAFT FAN WITH LOW PART-SPAN SOLIDITY

BACKGROUND OF THE INVENTION

The present invention relates generally to aircraft engines, and more specifically to aircraft engines incorporating a fan.

In a turbofan engine air is pressurized in a compressor and mixed with fuel in a combustor for generating hot combustion gases. A high pressure turbine (HPT) extracts energy from the combustion gases to power the compressor. A low pressure turbine (LPT) extracts additional energy from the combustion gases to power the fan disposed upstream from the compressor.

The primary design objective of aircraft turbofan engines is to maximize efficiency thereof for propelling an aircraft in flight, and correspondingly reduce fuel consumption. Accordingly, the various cold and hot section rotor and stator components which define the internal flow passages for the pressurized air and combustion gases, and which extract energy from those gases, are specifically designed for maximizing the efficiency thereof while correspondingly obtaining a long useful life.

The turbofan itself includes a row of large fan rotor blades extending radially outwardly from the perimeter of a supporting rotor disk. The fan is powered by the LPT for pressurizing the incident air for producing a majority of propulsion thrust discharged from the fan outlet. Some of the fan air is channeled into the compressor wherein it is pressurized and mixed with fuel for generating the hot combustion gases from which energy is extracted in the various turbine stages, and then discharged through a separate core engine outlet.

Turbofan engines are continually being developed and improved for maximizing their thrust capability with the greatest aerodynamic efficiency possible. Since the fan produces a substantial amount of thrust during operation, noise is also generated therefrom and should be reduced as much as possible consistent with the various competing design objectives.

For example, fan blades are typically designed for maximizing the aerodynamic loading thereof to correspondingly maximize the amount of propulsion thrust generated during operation. However, fan loading is limited by stall, flutter, or other instability parameters of the air being pressurized.

Accordingly, modern turbofan engines are designed with a suitable value of stability and stall margin over their operating cycle from takeoff to cruise to landing of the aircraft to ensure acceptable operation and performance of the engine without overloading the capability of the turbofan.

Furthermore, modern turbofan engines have relatively large diameter turbofans which rotate at sufficient rotary velocity to create supersonic velocity of the blade tips relative to the incident air stream. The blade tips are therefore subject to the generation of shock waves as the air is channeled and pressurized in the corresponding flow passages defined between adjacent fan blades.

Accordingly, each fan blade is specifically tailored and designed from its radially inner platform to its radially outer tip and along its circumferentially opposite pressure and suction sides which extend in chord axially between the opposite leading and trailing edges thereof. The pressure side of one airfoil defines with the suction side of an adjacent airfoil the corresponding flow passage from root to tip of the blades through which the air is channeled during operation.

Each airfoil is typically twisted with a corresponding angle of stagger from root to tip, with airfoil tips being aligned obliquely between the axial and circumferential directions of the fan.

During operation, the incoming ambient air flows at different relative velocities through the inter-blade flow passages from root to tip of the blades including subsonic airflow at the blade roots and radially outwardly thereof up to the supersonic velocity of the air at the blade tips in various portions of the operating range.

Fan stall margin is a fundamental design requirement for the turbofan and is affected by the aerodynamic fan loading, the fan solidity, and the fan blade aspect ratio. These are conventional parameters, with the fan loading being the rise in specific enthalpy across the fan blades divided by the square of the tip speed.

Blade solidity is the ratio of the blade chord, represented by its length, over the blade pitch, which is the circumferential spacing of the blades at a given radius or diameter from the axial centerline axis. In other words, blade pitch is the circumferential length at a given diameter divided by the number of blades in the full fan blade row. And, the fan blade aspect ratio is the radial height or span of the airfoil portion of the blade divided by its maximum chord.

Conventional experience or teachings in the art indicate that when inlet Mach numbers are sufficiently high that passage shock can separate the suction surface boundary layer of the air in the inter-blade flow passages, good efficiency requires that the solidity should be high to allow the flow to reattach.

Conventional design practice for turbofan efficiency and adequate fan stall margin typically require the relatively high tip solidity which is generally equal to the fan tip relative Mach number at the design point, such as cruise operation. In other words, the tip Mach number is suitably greater than one (1.0) for supersonic flow, and the fan tip solidity is correspondingly greater than one and generally equal to the tip relative Mach number for good designs.

The design considerations disclosed above are merely some of the many competing design parameters in designing a modern turbofan primarily for good aerodynamic performance and efficiency, as well as for good mechanical strength for ensuring a long useful life thereof. Each fan blade twists from root to tip, and the opposite pressure and suction sides thereof also vary in configuration to specifically tailor the flow passages from root to tip for maximizing fan efficiency with suitable stall margin and mechanical strength.

The resulting turbofan design is a highly complex design with three dimensional variation of the pressure and suction sides of the individual airfoils across their axial chord and over their radial span. And, the individual fan blades cooperate with each other in the full row of blades to define the inter-blade flow passages and to effect the resulting aerodynamic performance and stall margin of the entire fan.

Accordingly, it is desired to further improve the efficiency of the modern turbofan while maintaining adequate stability and stall margin notwithstanding the various competing design objectives addressed in part above.

BRIEF DESCRIPTION OF THE INVENTION

According to one aspect of the technology described herein, a fan for powering an aircraft in flight includes: an annular casing; a disk disposed inside the casing and mounted for rotation about an axial centerline, the disk including a row of fan blades extending radially outwardly therefrom; each of the fan blades including an airfoil having circumferentially opposite pressure and suction sides extending radially in span from a root to a tip, and extending axially in chord between spaced-apart leading and trailing edges, with the airfoils defining corresponding flow passages therebetween for pressurizing air; the row including no more than 21 and no less than 13 of the fan blades; and wherein each of the fan blades has a solidity defined by a ratio of the airfoil chord over a circumferential pitch of the fan blades, measured at 60% of a radial distance from the axial centerline to the tip, of less than about 1.6.

According to another aspect of the technology described herein, a method is provided of operating a fan of the type including a disposed inside an annular casing, the disk rotatable about an axial centerline and carrying a row of fan blades, wherein each of the fan blades includes an airfoil having spaced-apart pressure and suction sides extending radially in span from a root to a tip, and extending axially in chord between spaced-apart leading and trailing edges, the row including no more than 21 and no less than 13 of the fan blades, wherein each of the fan blades has a solidity defined by a ratio of the airfoil chord to a circumferential pitch of the fan blades, measured at 90% of a distance from the axial centerline to the tip, of no greater than about 1.2 and no less than about 1.0. The method includes: powering the fan in a turbofan engine to propel an aircraft in flight, such that a relative Mach number at the tips of the fan blades is greater than 1.0, and such that a ratio of the solidity measured at 90% of the distance from the axial centerline to the tips to the relative Mach number at the same radial location, is less than about 0.90.

According to another aspect of the technology described herein, a method is provided of designing a fan of the type including a disposed inside an annular casing, the disk rotatable about an axial centerline and carrying a row of fan blades, wherein each of the fan blades includes an airfoil having spaced-apart pressure and suction sides extending radially in span from a root to a tip, and extending axially in chord between spaced-apart leading and trailing edges, the row including no more than 21 and no less than 13 of the fan blades, wherein each of the fan blades has a solidity defined by the ratio of the airfoil chord to a circumferential pitch of the fan blades. The method includes: establishing a predetermined relative Mach number at the tips of the fan blades which is no less than about 1.0; selecting a chord of the fan blades, given the predetermined relative Mach number, such that a ratio of the solidity, measured at 90% of the distance from the axial centerline to the tips to the relative Mach number at the same radial location, is less than about 0.90.

According to another aspect of the technology described herein, an aircraft engine for powering an aircraft in flight includes: a fan, including: an annular casing; a disk disposed inside the casing and mounted for rotation about an axial centerline, the disk including a row of fan blades extending radially outwardly therefrom; each of the fan blades including an airfoil having circumferentially opposite pressure and suction sides extending radially in span from a root to a tip, and extending axially in chord between spaced-apart leading and trailing edges, with the airfoils defining corresponding flow passages therebetween for pressurizing air; the row including no more than 21 and no less than 13 of the fan blades; and wherein each of the fan blades has a solidity defined by a ratio of the airfoil chord over a circumferential pitch of the fan blades, measured at 60% of a radial distance from the axial centerline to the tip, of less than about 1.6; and a prime mover coupled to the fan and operable to drive the fan in flight.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
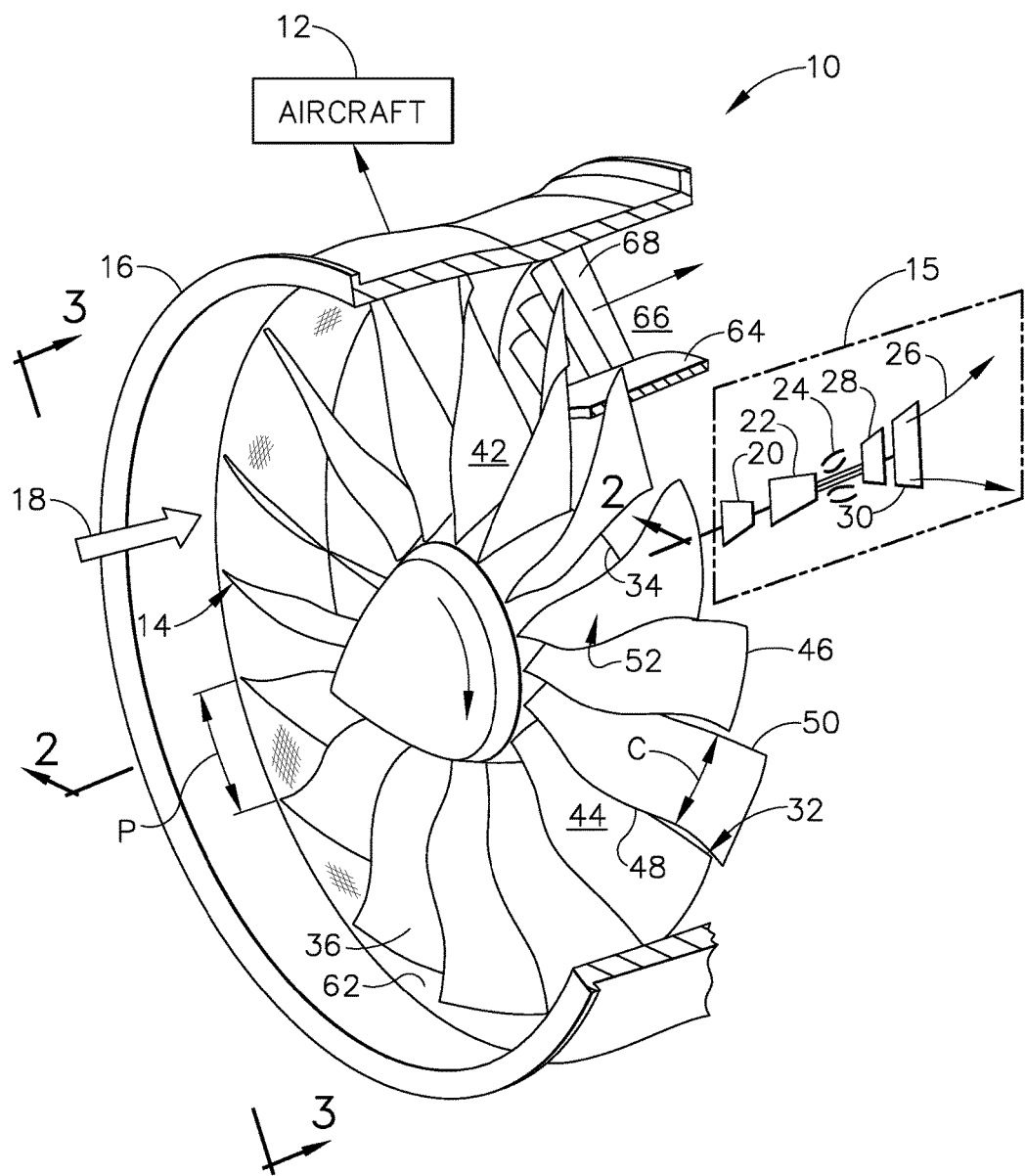
FIG. 1 is a partly schematic isometric view of a turbofan in an aircraft engine for powering an aircraft in flight.

Illustrated in FIG. 1 is an aircraft engine 10 configured for powering an aircraft 12 in flight, and suitably mounted therein. The engine is axisymmetrical about a longitudinal or axial centerline axis and includes a fan or turbofan 14 suitably mounted coaxially inside a surrounding annular fan casing 16.

During operation, ambient air 18 enters the inlet end of the fan 14 and is pressurized thereby for producing thrust for propelling the aircraft in flight. The fan 14 is drive by a prime mover 15 which is illustrated schematically by a dashed line in FIG. 1. The prime mover may be any device operable to rotate the fan 14 at the required speed under expected mechanical and aerodynamic loads. Nonlimiting examples of prime movers include heat engines, motors (e.g. electric, hydraulic, or pneumatic), or combinations thereof (for example electric hybrid). The fan 14 may be driven directly by the prime mover 15, or through an intermediate geartrain. In the illustrated example, the prime mover 15 comprises a gas turbine engine. A portion of the fan air is suitably channeled in turn through a low pressure or booster compressor 20 and a high pressure compressor 22 which further pressurize the air in turn.

The pressurized air is mixed with fuel in an annular combustor 24 for generating hot combustion gases 26 which are discharged in the downstream direction. A high pressure turbine (HPT) 28 first receives the hot gases from the combustor for extracting energy therefrom, and is followed in turn by a low pressure turbine (LPT) 30 which extracts additional energy from the combustion gases discharged from the HPT. The HPT is joined by one shaft or rotor to the high pressure compressor 22, and the LPT is joined by another shaft or rotor to both the booster compressor 20 and the fan 14 for powering thereof during operation.

The exemplary turbofan engine 10 illustrated in FIG. 1 may have any conventional configuration and operation for powering an aircraft in flight from takeoff to cruise to landing, but is modified as further described hereinbelow for increasing the aerodynamic efficiency of the fan 14 while maintaining suitable stability and stall margin thereof during the operating cycle.

Figure 2:
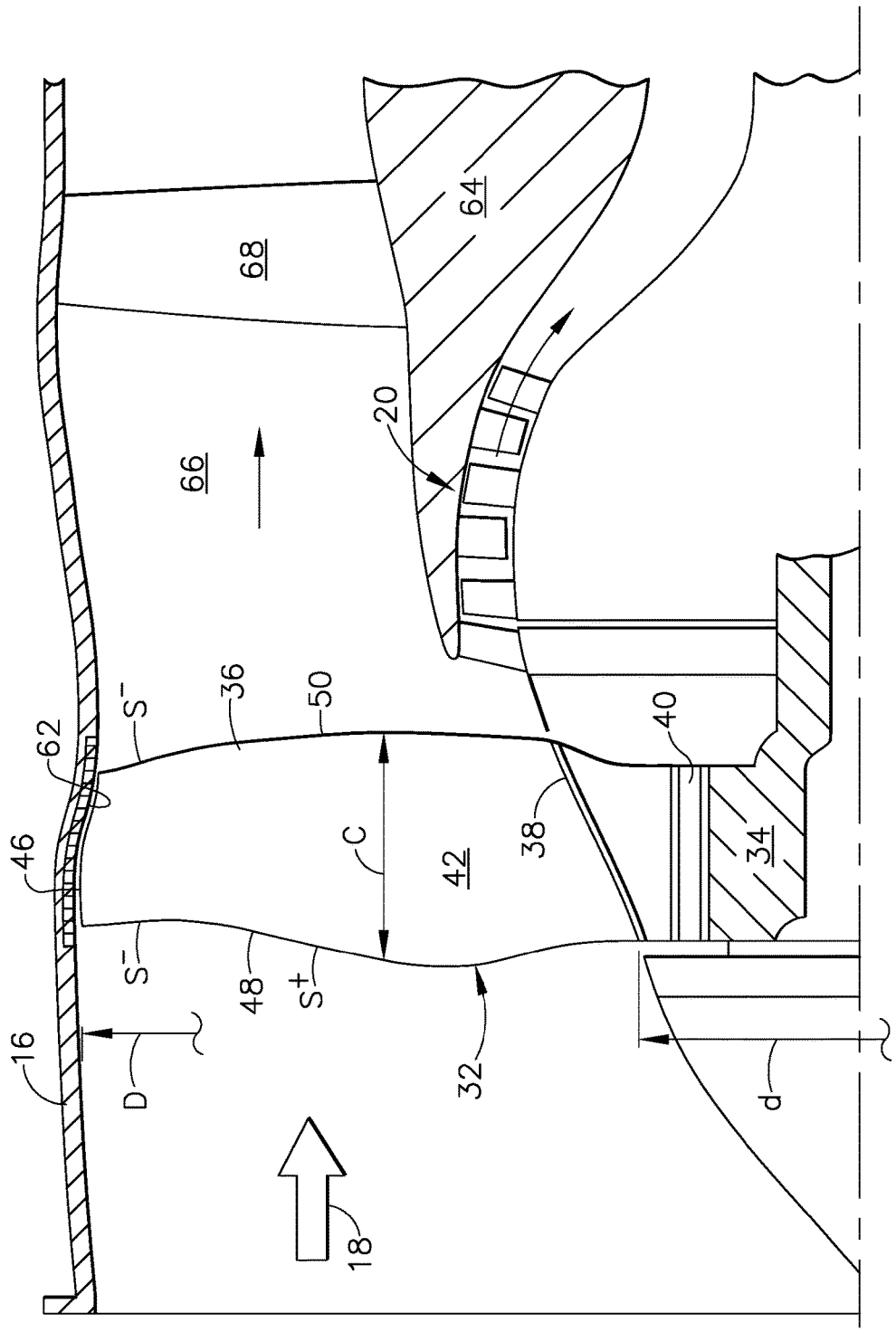
FIG. 2 is an axial sectional view through the turbofan portion of the engine illustrated in FIG. 1 and taken along line 2-2.

More specifically, FIGS. 1 and 2 illustrate an exemplary embodiment of the turbofan 14 which includes a row of fan rotor blades 32 extending radially outwardly in span from the perimeter rim of a supporting rotor disk 34. As shown in FIG. 2, each blade includes an airfoil 36 extending outwardly from a platform 38 defining the radially inner boundary of the fan air flowpath, which platform may be integrally formed with the airfoil or a separate component. The principles of the present invention apply equally to a fan having a disk with separate blades as well as to a fan having the blades integrally formed with the disk, often referred to as a "bladed disk", "integrally-bladed rotor", or "blisk". In the specific example illustrated, each blade also includes an integral dovetail 40 extending radially inwardly from the airfoil below the platform for mounting each blade in a corresponding dovetail slot in the rim of the rotor disk 34.

The fan blades 32 may be made from suitable high strength materials like titanium or carbon fiber composites. For example, the majority of the fan blade 32 may be formed of carbon fiber composite reinforced with titanium shields along the leading and trailing edges, and along the tip.

As illustrated in FIGS. 1 and 2, each airfoil 36 has a suitable aerodynamic configuration including a generally concave pressure side 42 and a circumferentially opposite, generally convex suction side 44. The opposite sides of each airfoil extend radially in span from the inner root end thereof at the platform 38 to the radially outer distal tip 46 disposed closely adjacent to the fan stator casing 16 for providing a relatively small tip clearance or gap therebetween.

Figure 3:
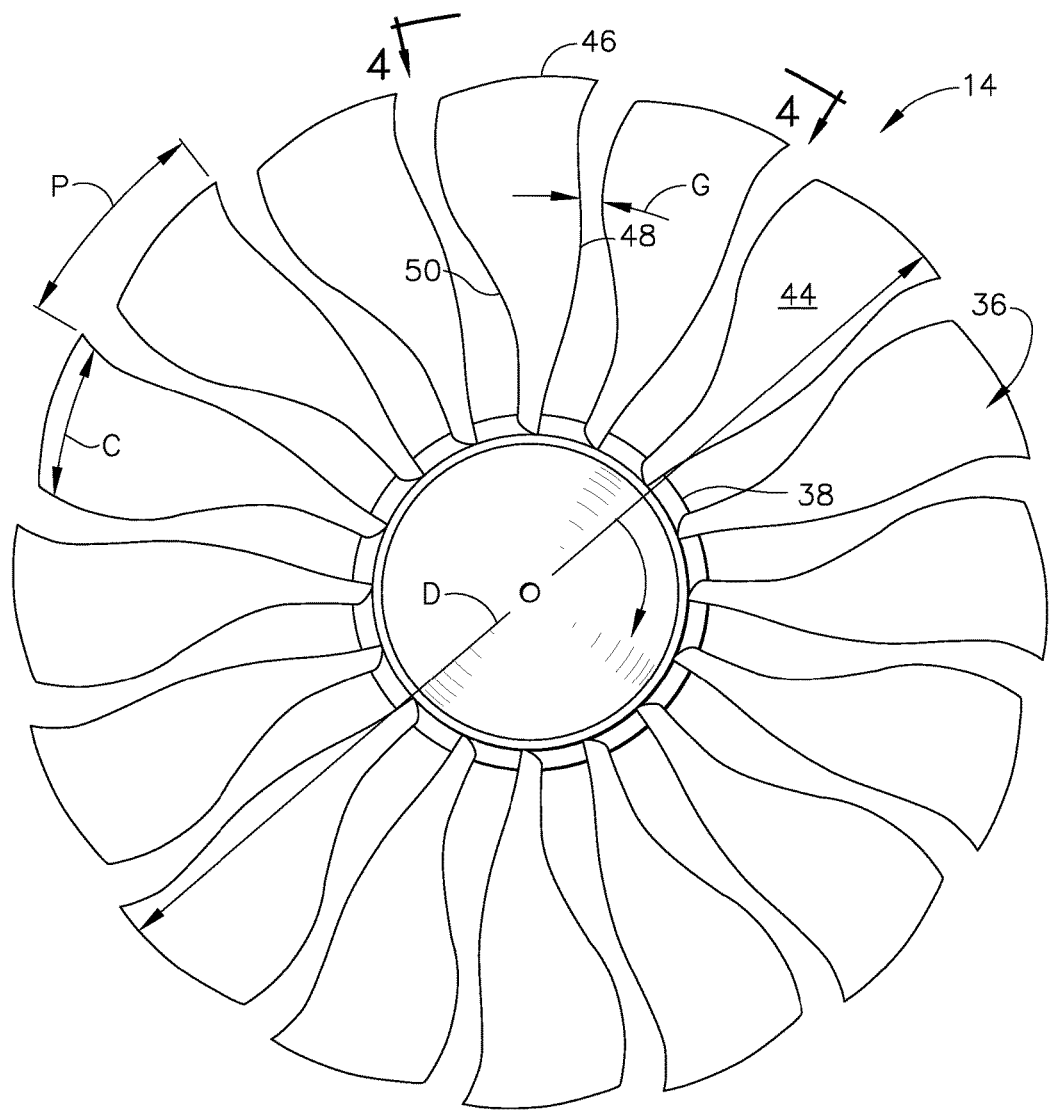
FIG. 3 is a forward-facing-aft elevational view of the turbofan illustrated in FIG. 1 and taken along line 3-3.

As shown in FIGS. 2 and 3, each airfoil extends axially in chord C between opposite leading and trailing edges 48, 50, with the chord varying in length over the span of the airfoil.

Figure 4:
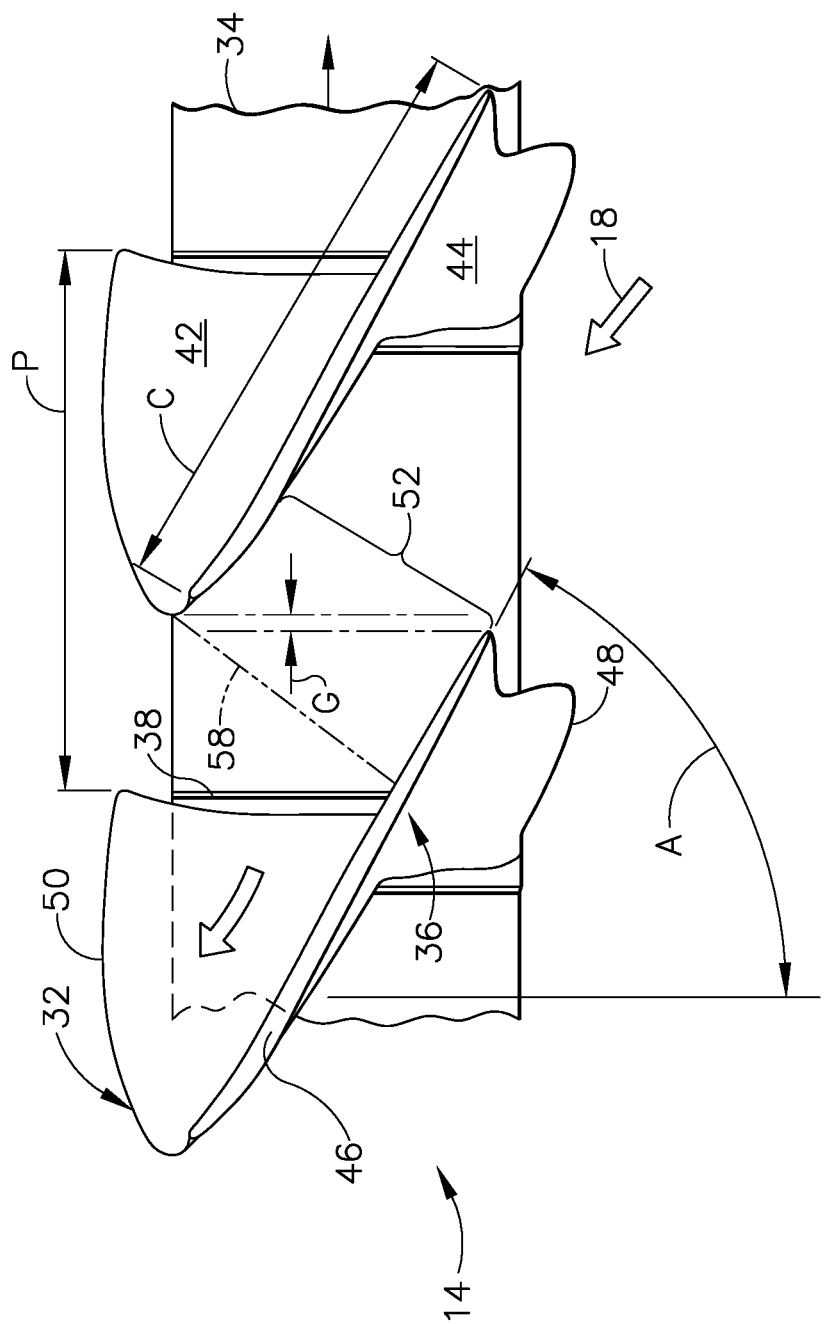
FIG. 4 is a top planform view of two adjacent fan blades illustrated in FIG. 3 and taken generally along line 4-4.

As shown in FIG. 4, adjacent airfoils 36 define circumferentially therebetween corresponding flow passages 52 for pressurizing the air 18 during operation. Each of the airfoils 36 may include stagger or twist represented by the stagger angle A from the axial or longitudinal axis, which stagger increases between the root and tip of the airfoil.

For example, the stagger angle A at the blade tip 46 may be substantial, and about 60 degrees, to position the leading edge 48 of one airfoil circumferentially adjacent but axially spaced from the suction side 44 of the next adjacent airfoil aft from the leading edge thereof to define a corresponding mouth 54 for the flow passage between the opposing pressure and suction sides of the adjacent airfoils. The contours and stagger of the adjacent airfoils over the radial span of the blades cause each flow passage to converge or decrease in flow area to a throat 56 of minimum flow area spaced aft from the mouth along most, if not all, of the radial span.

As further illustrated in FIG. 4, the relatively high airfoil stagger A also positions the trailing edge 50 of one airfoil 36 circumferentially adjacent to the pressure side 42 of the next adjacent airfoil while also being spaced axially therefrom in the tip region to define a corresponding discharge or outlet 58 for the corresponding flow passage between adjacent airfoils. In this way, the incoming air 18 is channeled in the corresponding flow passages 52 between adjacent airfoils as they rotate clockwise in FIGS. 1, 3, and 4 for pressurizing the air to produce the propulsive thrust during operation.

FIGS. 1 and 2 also illustrate that the turbofan includes an annular tip shroud 62 suitably mounted flush inside the fan stator casing 16 and directly surrounding the airfoil tips 46 which are positioned closely adjacent thereto to define a correspondingly small tip clearance therewith. The tip shroud 62 may be conventional in configuration, such as a lightweight honeycomb structure, with a substantially smooth inner surface facing the blade tips. The low solidity turbofan enjoys improved efficiency while maintaining adequate stability and stall margin without the need for stability enhancing features such as annular grooves which could otherwise be formed in the tip shroud.

As shown in FIG. 2, the fan casing 16 is spaced radially outwardly from an inner casing 64 which surrounds the core engine to define an annular bypass duct 66 radially therebetween. The aft end of the bypass duct 66 defines the outlet for a majority of the fan air used in producing propulsive thrust for the engine.

Spaced downstream or aft from the row of fan blades 32 is a row of outlet guide vanes 68 extending radially inwardly from the fan casing 16 to join the inner casing 64.

As seen in FIG. 3, the fan blades 32 are of suitably large outer diameter D for effecting supersonic airflow at the tips during operation. The fan 14 also has a corresponding solidity which is a conventional parameter equal to the ratio of the airfoil chord C, as represented by its length, divided by the circumferential pitch P or spacing from blade to blade at the corresponding span position or radius.

The circumferential pitch is equal to the circumferential length at the specific radial span divided by the total number of fan blades in the blade row. Accordingly, the solidity is directly proportional to the number of blades and chord length and inversely proportional to the diameter.

Conventional practice as indicated above requires relatively high solidity for maintaining good efficiency in a supersonic blade design subject to shock in the flow passages between the adjacent airfoils.

However, it has been discovered that notwithstanding this conventional practice for relatively high solidity in modern turbofans, a substantial improvement in efficiency while maintaining adequate stability and stall margin may be obtained by decreasing solidity, and not increasing solidity. As indicated above, solidity is proportional to the number of fan blades and the ratio of the airfoil chord divided by the diameter of the fan.

Accordingly, solidity may be decreased by decreasing the number of fan blades, decreasing the airfoil chord, or increasing the outer diameter of the fan. However, the fan outer diameter is typically a given parameter for a specifically sized turbofan engine.

It is further noted that fan blades for a particular fan would tend to have approximately the same thickness dimension even if the chord dimension is varied, because the thickness dimension is usually set for structural reasons as opposed to aerodynamic reasons. Accordingly, a parameter referred to as "thickness blockage" tends to be less when the blade count is lower. For this reason, considering a given solidity, there is an efficiency advantage to achieving this solidity in part through a lower blade count.

Accordingly, aerodynamic efficiency may be improved in a turbofan engine 10 by using a relatively smaller number of fan blades 32 is compared to prior art designs. In one, the fan 14 may include thirteen to twenty-one fan blades 32. In another example, the fan 14 may include fifteen to twenty fan blades 32.

The reduction in number of fan blades increases the circumferential pitch P between the airfoils and increases the flow area of the flow passages 52, in particular at the throats 56 thereof, for reducing flow blockage during operation. The tip solidity of the turbofan 14 is relatively low in magnitude, while still being greater than about 1.0 to provide a circumferential gap G between the leading and trailing edges 48, 50 of adjacent tips 46.

The airfoil tips 46 are locally angled and vary in width between the leading and trailing edges 48, 50 to typically converge the flow passage 52 at the airfoil tips from the mouth 54 to the throat 56 and then diverge the flow passage also at the tip from the throat 56 to the outlet 58. Alternatively, the mouth and throat of the flow passages at the airfoil tips may be coincident in one plane at the leading edges, with the flow passages still diverging aft from the throats at the leading edges to the passage outlets at the trailing edges.

The turbofan design may itself be otherwise conventional except as specifically described herein For example, the airfoils 36 illustrated in FIGS. 1-4 are relatively large in diameter for supersonic tip operation in a modem turbofan engine. The corresponding bypass ratio of the fan air which bypasses the core engine may be about 7.5 or greater.

The airfoils may be provided with suitable aerodynamic sweep which is preferably forward or negative (S−) at the tips 46 of the airfoils, and preferably negative along both the leading and trailing edges 48, 50 thereof. The individual airfoils may have a large chord barreling near their midspan as illustrated in FIG. 2 with aft or positive aerodynamic sweep (S+) along a portion of the leading edge above the midspan if desired. The forward tip sweep in the fan blades improves efficiency during supersonic operation of the blade tips.

It has been found that reduction of solidity at locations inboard of the tip 46 is useful to improve aerodynamic performance and/or aerodynamic efficiency of the fan 14. This reduction of solidity may be implemented by reducing chord C at locations inboard of the tip 46.

Figure 5:
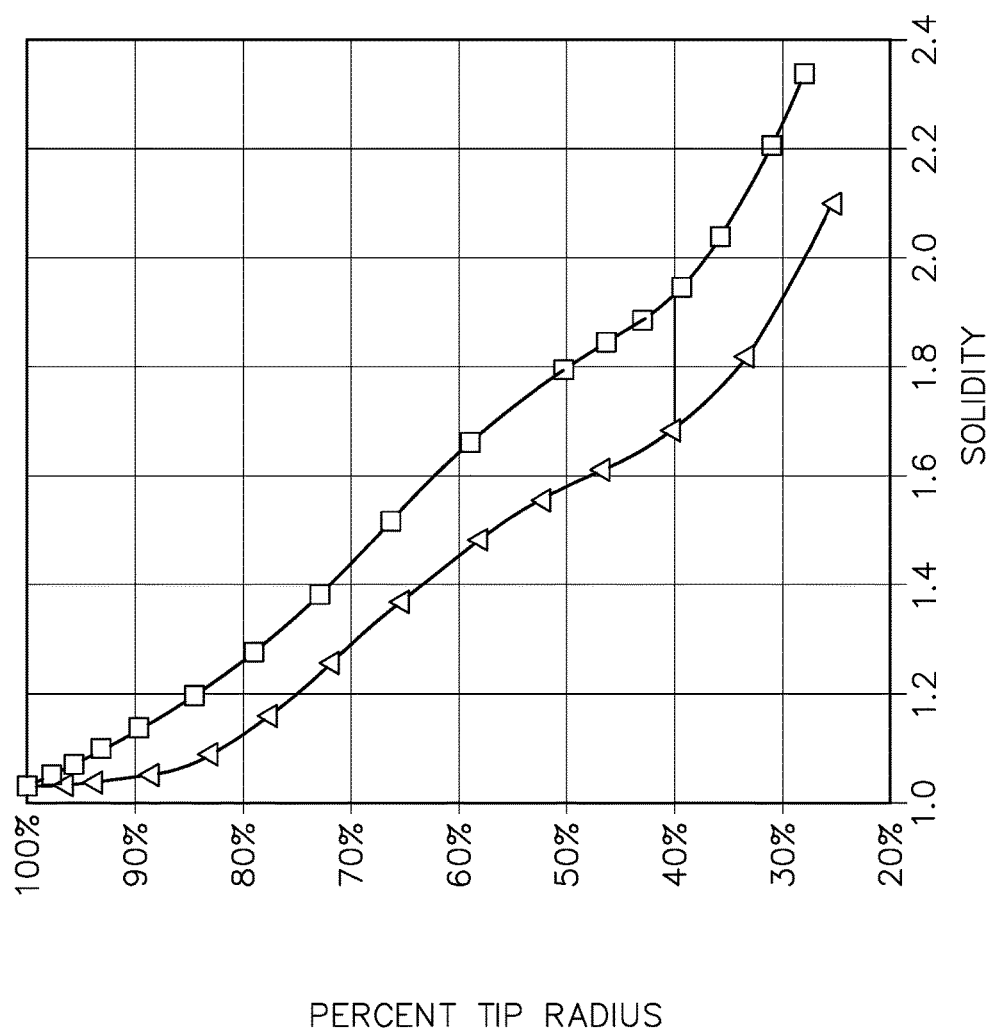
FIG. 5 is a graph showing blade solidity plotted against percent radius for an exemplary fan.

FIG. 5 illustrates the characteristics of the fan design according to an aspect of the present invention (shown by a line with triangular markers) as compared to a prior art design (shown by a line with square markers). It can be seen that, while the solidity is close to 1.0 at the tip for both designs, the solidity of the fan 14 is lower at all locations inboard of the tip. The offset graph describing the lowered solidity at inboard locations may be characterized by the solidity values at representative locations along the span.

One representative location is at 90% of the radial distance from the axial centerline to the tip, also referred to herein as "90% of tip radius". For example, the fan 14 may have a solidity measured at 90% of tip radius, of about 1.0 to about 1.2. As used herein, the term "about" encompasses the stated value or range of values, as well as variations or deviations from the stated value or range of values that do not significantly affect aerodynamic behavior compared to the stated value or range of values, and/or are caused by errors in measurement, and/or are caused by variation in manufacturing processes.

Another representative location is at 60% of the radial distance from the axial centerline to the tip, also referred to herein as "60% of tip radius". For example, the fan 14 may have a solidity measured at 60% of tip radius, of less than about 1.6. As another example, the fan 14 may have a solidity, measured at 60% of tip radius, of no greater than about 1.4.

Another representative location is at 30% of the radial distance from the axial centerline to the tip, also referred to herein as "30% of tip radius". For example, the fan 14 may have a solidity, measured at 30% of the radial distance from the root to the tip, of less than about 2.2. As another example, the fan 14 may have a solidity, measured at 30% of tip radius, of no greater than about 1.9.

It has been further found that consideration of the ratio of solidity to relative Mach number (abbreviated "$M_{rel}$") at locations inboard of the tip is also useful in improving efficiency. It will be understood that the relative Mach number will vary during operation of the engine 10 depending on the phase of operation (e.g. idle, take-off, climb, cruise, approach, landing) as well as prevailing atmospheric conditions. When the term Mach number or relative Mach number is discussed herein, it will be understood that this refers to a value that is selected to be significant for design purposes. For example, the Mach number considered for design purposes may be a value representative of the expected Mach number at level cruise flight conditions. As used herein, "level cruise flight" refers to extended operation at a stabilized altitude and Mach number.

Figure 6:
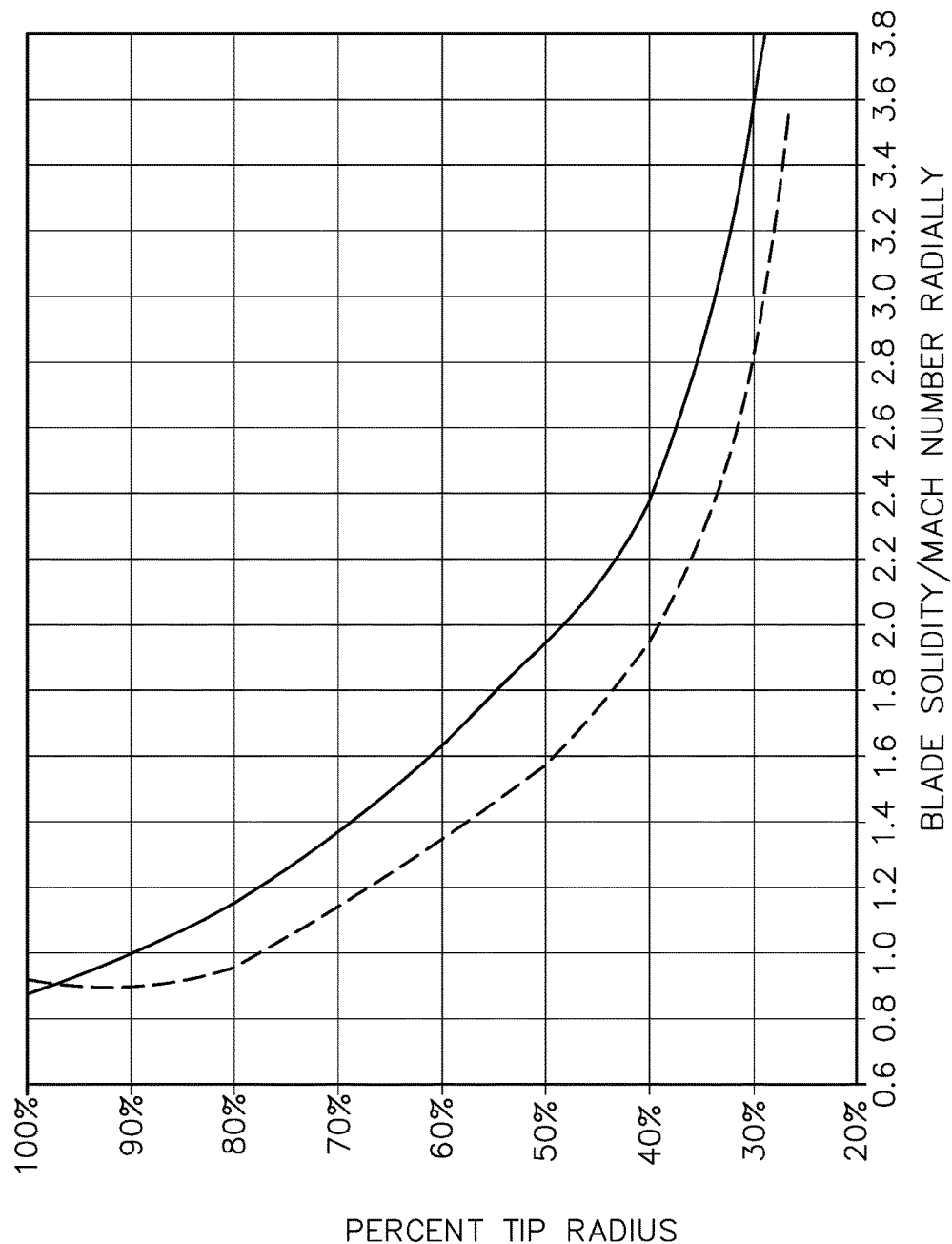
FIG. 6 is a graph showing a ratio of blade solidity to relative Mach number plotted against percent radius.

FIG. 6 illustrates the characteristics of the fan design according to an aspect of the present invention (shown in a dashed line) as compared to a prior art design (shown in a solid line). It can be seen that, while ratio of solidity to relative Mach number is close to 1.0 at the tip for both designs, the ratio of the fan 14 is lower at all locations inboard of the tip. The offset graph describing the lowered ratio at inboard locations may be characterized by the solidity/$M_{rel}$ values at representative locations along the span.

One representative location is at 90% of tip radius. For example, given a predetermined relative Mach number, the solidity may be selected such that the ratio solidity/$M_{rel}$ is less than about 0.90. As another example, the solidity of the may be set, given a predetermined relative Mach number, such that the ratio solidity/Mrel is no greater than about 0.87.

Another representative location is at 60% of tip radius. For example, given a predetermined relative Mach number Mrel, the fan 14 may have a ratio solidity/$M_{rel}$, measured at 60% of tip radius, of less than about 1.50. As another example, the fan 14 may have a ratio solidity/$M_{rel}$, measured at 60% of tip radius, of about 1.35 or less.

Another representative location is at 30% of tip radius. For example, given a predetermined relative Mach number Mrel, the fan 14 may have a ratio solidity/$M_{rel}$, measured at 30% radius, of less than about 3.20. As another example, the fan 14 may have a ratio solidity/$M_{rel}$, measured at 30% of tip radius, of about 2.81 or less.

Any of the fans 14 described above may be designed in part by establishing a predetermined relative Mach number at a specific radial location, and then given that predetermined relative Mach number, selecting a chord of the fan blades 32 at the specific radial location, to result in the desired ratio of the solidity to the relative Mach number.

The fan 14 may be used by powering the fan 14 in the turbofan engine 10 to propel an aircraft (not shown) in atmospheric flight, such that a relative Mach number at the tips of the fan blades is greater than 1.0.

The low solidity turbofan disclosed above may be used in various designs of modern turbofan aircraft gas turbine engines for improving efficiency thereof. Particular advantage is obtained for relatively large diameter transonic turbofans in which the blade tips are operated with supersonic airflow.

Analysis of the fans disclosed above has confirmed an increase in aerodynamic efficiency thereof as compared to prior art fans, while maintaining adequate stability and stall margin. The reduced blade count correspondingly reduces engine weight and cost.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A method of operating a fan of the type including a disk disposed inside an annular casing, the disk rotatable about an axial centerline and carrying a row of fan blades, wherein each of the fan blades includes an airfoil having spaced-apart pressure and suction sides extending radially in span from a root to a tip, and extending axially in chord between spaced-apart leading and trailing edges, the row including no more than 21 and no less than 13 of the fan blades, wherein each of the fan blades has a solidity defined by a ratio of the airfoil chord to a circumferential pitch of the fan blades, measured at 90% of a radial distance from the axial centerline, to the tip, of no greater than about 1.2 and no less than about 1.0, the method comprising:

powering the fan to propel an aircraft in level cruise flight, such that a relative Mach number at the tips of the fan blades is greater than 1.0, and such that a ratio of the solidity measured at 90% of the radial distance from the axial centerline to the tip, to the relative Mach number at the same radial location, is less than about 0.90.

2. The method of claim 1 wherein a ratio of the solidity measured at 90% of a radial distance from the axial centerline, to the relative Mach number at the same radial location is no greater than about 0.87.

3. The method of claim 2 wherein:
a ratio of the solidity measured at 60% of the radial distance from the axial centerline to the tip, to the relative Mach number at the same radial location, is no greater than about 1.35.

4. The method of claim 1 wherein:
a ratio of the solidity measured at 60% of the radial distance from the axial centerline to the tip, to the relative Mach number at the same radial location, is no greater than about 1.50.

5. The method of claim 4 wherein:
a ratio of the solidity measured at 30% of the radial distance from the axial centerline to the tip, to the relative Mach number at the same radial location, is no greater than about 3.20.

6. The method of claim 5 wherein:
a ratio of the solidity measured at 30% of the radial distance from the axial centerline to the tip, to the relative Mach number at the same radial location, is no greater than about 2.81.

7. The method of claim 1 wherein the row includes no more than 20 and no less than 15 of the fan blades.

8. The method of claim 7 wherein the chord of the fan blades at the tips is selected such that ratio of the solidity of the tips to the relative Mach number at 90% of the distance from the axial centerline to the tips is no greater than about 0.87.

9. The method of claim 7, further comprising:
establishing a predetermined relative Mach number at 60% of the radial distance from the axial centerline to the tip;
selecting a chord of the fan blades at 60% of the radial distance from the axial centerline to the tip, given the predetermined relative Mach number, such that a ratio of the solidity measured at 60% of the radial distance from the axial centerline to the tip, to the relative Mach number at the same radial location, is no greater than about 1.50.

10. The method of claim 9 wherein a ratio of the solidity measured at 60% of the radial distance from the axial centerline to the tip, to the relative Mach number at the same radial location, is no greater than about 1.35.

11. The method of claim 10, further comprising:
establishing a predetermined relative Mach number at 30% of the radial distance from the axial centerline to the tip;
selecting a chord of the fan blades at 30% of the radial distance from the axial centerline to the tip, given the predetermined relative Mach number, such that a ratio of the solidity measured at 30% of the radial distance from the axial centerline to the tip, to the relative Mach number at the same radial location, is no greater than about 3.20.

12. The method of claim 11 wherein a ratio of the solidity measured at 30% of the radial distance from the axial centerline to the tip, to the relative Mach number at the same radial location, is no greater than about 2.81.

* * * * *